UNITED STATES PATENT OFFICE.

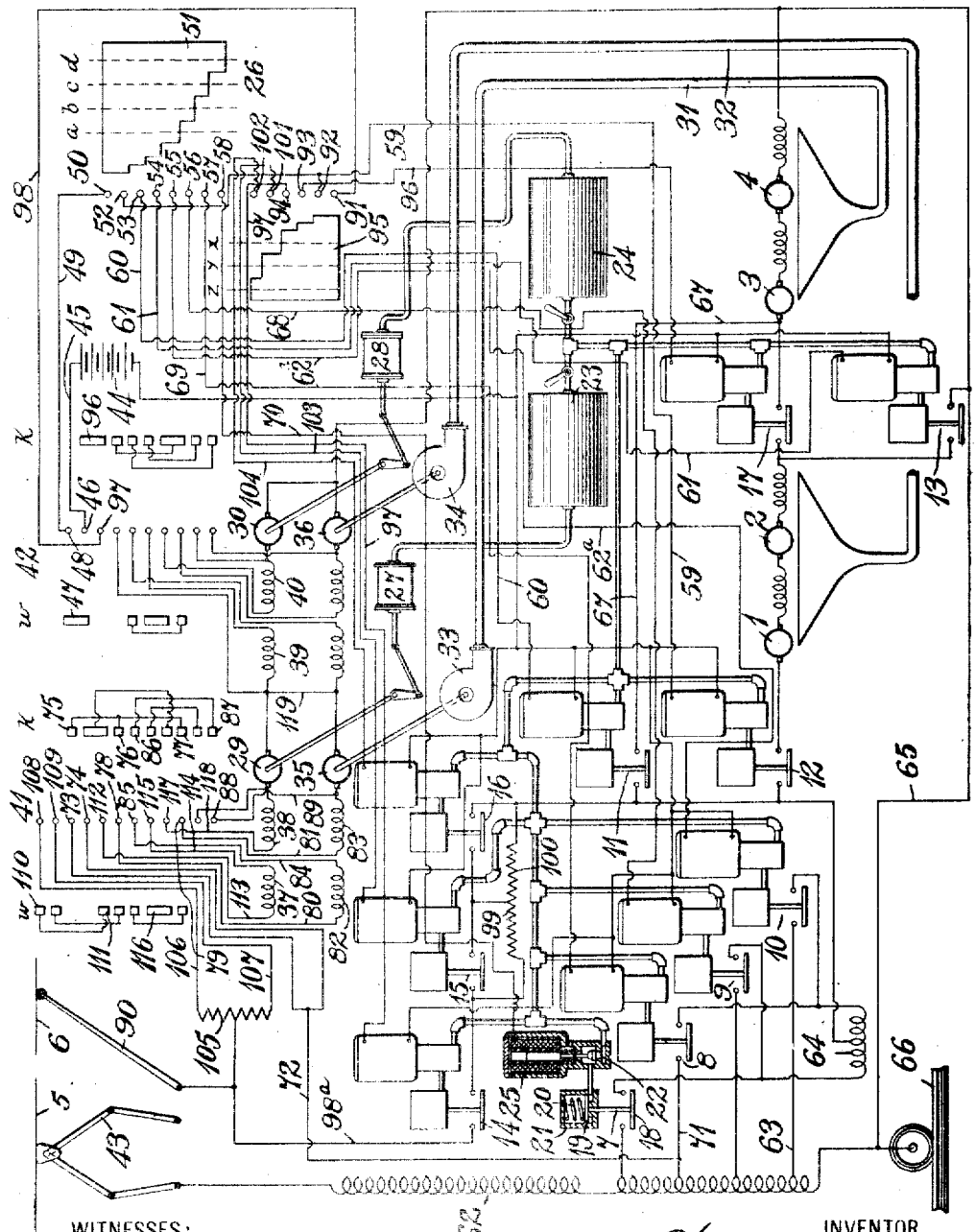

WILLIAM COOPER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

SYSTEM OF ELECTRIC-MOTOR CONTROL.

949,114.     Specification of Letters Patent.     Patented Feb. 15, 1910.

Application filed May 4, 1908. Serial No. 430,830.

*To all whom it may concern:*

Be it known that I, WILLIAM COOPER, a citizen of the United States, and a resident of Pittsburg, in the county of Allegheny and State of Pennsylvania, have invented a new and useful Improvement in Systems of Electric-Motor Control, of which the following is a specification.

My invention relates to systems of electric motor control and it has special reference to such systems as are adapted for the control of the traction motors of railway vehicles and also the auxiliary motors which are often carried in the cabs of such vehicles.

The object of my invention is to provide an improved arrangement of auxiliary motors for use in systems of the class above indicated which shall be simple, and effective of desirable results.

When electric locomotives having motors of relatively large current capacity are provided with control systems having a plurality of pneumatically operated switches, according to well known practice, auxiliary electric motors are usually provided for driving blowers or fans for cooling the traction motors and compressors for maintaining desired pressures in reservoirs or cylinders which supply the control switches and which also supply the actuating pressure to air brakes found both on the locomotive and on its train of cars.

In order to avoid delays and accidents which may result from the failure of any of the auxiliary apparatus, the driving motors for the compressors are usually provided in duplicate and, for the sake of convenience, it has been usual to connect like motors of this kind having the same current-carrying capacities in series with each other across the supply circuit.

By reason of the inherent characteristics of the compressors, the full load is applied to their driving motors irrespective of the speed at which they operate and, consequently, a relatively large current is required to start the motors. On the other hand, the motors which drive the fans or blowers start very readily since their load is very light at slow speeds and increases as the motor accelerates.

According to my present invention, the compressor motors may be started more readily by reason of a cross connection which joins the middle points in the two auxiliary motor circuits, one of which includes the two compressor motors in series and the other of which includes the blower motors.

The single figure of the accompanying drawing is a diagrammatic view of a trolley system embodying the improved auxiliary motor arrangement of my invention.

Referring to the drawings, energy may be supplied to a plurality of electric vehicle traction motors 1, 2, 3, and 4 from either an alternating current supply conductor 5 or a direct current supply conductor 6, the motor circuit connections being controlled, when energy is supplied from the conductor 5, by a plurality of pneumatically operated switches 7, 8, 9, 10, 11, 12, and 13 and when energy is supplied from the conductor 6 by switches 14, 15, 16, 17, and 12.

The switches are all similar to the switch 7 which comprises a movable contact member 18, a piston or plunger 19 operatively connected thereto, a spring 20 which normally holds the switch open, a cylinder 21 in which the piston operates, a valve 22 which controls the supply of air pressure from either one of two tanks or reservoirs 23 and 24 and a valve magnet 25 which actuates the valve 22. The valve magnets are selectively governed by a master controller 26 as hereinafter pointed out.

The tanks or reservoirs 23 and 24 are supplied with compressed air by compressors 27 and 28 which are driven by motors 29 and 30 and which may be of any suitable construction. The traction motors 1, 2, 3, and 4 are cooled by a forced draft supplied through pipes 31 and 32 that are connected at one end, to centrifugal blowers or fans 33 and 34. These blowers are respectively driven by motors 35 and 36 which are similar to each other and which correspond, as to normal applied electromotive force, to the motors 29 and 30, the current-carrying capacity of the motors 35 and 36 being, however, ordinarily quite different from that of the motors 29 and 30.

The motors 29 and 30 are connected in series with each other and are provided with field magnet windings 37, 38, 39, and 40 which are connected in series with each other and with the motor armatures when direct current energy is supplied to the motors and are connected in multiple circuit groups, which are connected in series with the armatures, when the motors are supplied with energy from the alternating current source.

The master switch 26 is divided into two parts one of which is active when alternating current is supplied to the traction motors and the other of which is active when the direct current energy is supplied thereto, change-over switches 41 and 42 being provided for the purpose of maintaining suitable auxiliary motor circuit connections when the kind of energy supplied to the vehicle is changed.

The operation of, and the circuit connections for, the system are as follows: Assuming that the vehicle is supplied with alternating current energy from the conductor 5 through a trolley 43 and that the change-over switches occupy positions $k$, if the master switch is now moved from its off position to position $a$, energy is supplied from any convenient source, such as a battery 44, through a conductor 45, contact finger 46, contact member 47, finger 48, conductor 49 and contact finger 50 to a contact segment 51 of the master switch 26. The contact segment 51 is successively engaged by a plurality of fingers 52, 53, 54, and 55, as the controller is moved into position $a$, and by fingers 56, 57, and 58 as the controller successively occupies positions $b$, $c$, and $d$.

Current is first supplied through contact finger 52 and a conductor 59 to the valve magnet of the switch 12 after which energy is supplied through fingers 53, 54, and 55 and conductors 60, 61, and 62ᵃ to valve magnets of switches 11, 13, and 10. When the last mentioned switches are closed a circuit is established from conductor 5, through trolley 43 and a main circuit transformer 62, the circuit being continued from low voltage tap 63, switch 10, reactance coil 64, switch 12, motors 1 and 2, and switch 13 to negative conductor 65, which is connected in the usual manner to rail conductor 66.

Motors 3 and 4 are connected in multiple circuit to the motors 1 and 2 through switch 11 and conductor 67, the two motors being independently connected in series and to negative conductor 65. The motors may be accelerated by increasing the voltage impressed upon them by the transformer 62, this result being accomplished as the master controller occupies positions $b$, $c$, and $d$ since energy is successively supplied from segment 51 through contact fingers 56, 57, and 58, and conductors 68, 69, and 70 to the valve magnets of switches 9, 8, and 7. As these switches are closed, the motors are supplied with energy from higher voltage taps through the inductive resistance 64 in a well known manner.

As already pointed out, the controllers 41 and 42 occupy position $k$ when energy is supplied to the vehicle from an alternating current conductor. Under these conditions the circuit connections for the auxiliary motors are as follows: Alternating current energy is supplied from a tap 71 of the transformer 62 through a conductor 72 to contact fingers 73 and 74 and, from contact finger 73, circuit is completed through a contact member 75 (which is connected to contact members 76 and 77), contact fingers 78 and 79 and conductors 80 and 81, to field magnet windings 82 and 83 of the motor 35, and from the opposite terminals of the field magnet windings to the armature of the motor 35, one of said windings being directly connected thereto and the other being connected through conductor 84, contact finger 85, contact members 86 and 87, contact finger 88 and conductor 89. Circuit connections are similarly established for the motors 30 and 36 by the controller 42.

When direct current energy is supplied to the traction motors 1, 2, 3, and 4, the trolley 90 being in engagement with the supply conductor 6 and the trolley 43 separated from the conductor 5, the controllers 41 and 42 are moved to occupy position $w$ and the master switch is moved successively into positions $x$, $y$, and $z$. As the master switch is moved from its off position to its position $x$, a plurality of contact fingers 91, 92, 93, and 94 are successively engaged by contact member 95 and energy is supplied from the battery 44 through conductor 45, contact finger 46, contact member 96, contact finger 97, conductor 98, and contact finger 91 to the contact member 95. From this point, energy is supplied from contact fingers 92, 93, and 94 through conductors 59, 96, and 97 to the valve magnets of switches 12, 17, and 14.

A motor circuit is now established from the trolley 90 through conductor 98ᵃ, switch 14, resistance sections 99 and 100, switch 12, motors 1 and 2, switch 17, motors 3 and 4 and negative conductor 65 to the return circuit rail conductor 66. As controller 26 is moved into positions $y$ and $z$, the contact fingers 101 and 102 engage contact member 95 and circuits are completed through conductors 103 and 104 to the field magnets of switches 15 and 16. The closing of these switches successively short-circuits the resistance sections 99 and 100.

Since controllers 41 and 42 occupy position $w$, the circuit connections for the auxiliary motors are somewhat modified, their field magnet windings being now connected in series. A circuit is completed from trolley 90 to the middle point of a resistance 105, the extremities of which are connected by conductors 106 and 107 to contact fingers 108 and 109. From the finger 108, circuit is continued through contact members 110 and 111, contact finger 112, conductor 113, field magnet winding 37 of the motor 29, conductor 114, finger 115, contact member 116, finger 117, conductor 118, and field magnet winding 38 to the armature of the motor 29. The field magnet windings 82 and 83 of the motor 35 are similarly connected in series and the field magnet windings of the motors 30 and 36 are similarly controlled by the change-over switch 32.

The motors 29 and 30, which are operatively connected to the compressors 27 and 28, are connected in series with each other and motors 35 and 36, which are operatively connected to the blowers 33 and 34, are also in series with each other, the two pairs of motors being connected in multiple circuit. A conductor 119 joins the intermediate points of the two pairs of motors in order to assist the compressor motor in starting. For example, if it is desired to start the motors 29, 30, 35, and 36 at the same time, their circuits may be completed as hereinbefore described, but, by reason of the fact that the initial load on the blower motors is very light, they will, of course, tend to reach their full speed first and, since the load is applied to the compressor motors from the start, they will require considerable current, a part of which may traverse one compressor motor and one blower motor or one blower motor and one compressor motor by reason of the cross connection 119.

It is to be understood that modifications in the circuit connections of the system may be effected within the spirit and scope of my invention.

I claim as my invention:

1. In a control system, the combination with unlike sources of electric energy, a plurality of electric motors connected in pairs and means for adapting the motor field connections to the kind of energy supplied, of a bridging conductor or cross connection permanently joining intermediate points of equi-potential in said pairs.

2. In a control system, the combination with direct and alternating current sources of electric energy, four equi-voltage motors comprising two pairs and controllers for adapting the motor field connections to the kind of energy supplied, of a cross connection permanently joining intermediate equi-voltage points in the two pairs.

3. In a control system, the combination with two fans or blowers and motors operatively connected thereto and two compressors having motors operatively connected thereto, each group of said motors being connected in series and in multiple circuit with the other group, of a cross connection joining intermediate equi-potential points in the two groups.

4. In a control system, the combination with two electric motors in series operatively connected to loads which are independent of the motor speed, and two other motors connected in series and operatively connected to loads that vary with the speed, of a cross connection between intermediate equi-potential points in said motor circuits.

5. In a control system, the combination with a plurality of motors connected in series pairs, each pair having a different current-carrying capacity, of a bridging conductor or cross connection permanently joining intermediate points of equi-potential in said pairs.

6. In a control system, the combination with a plurality of equi-voltage motors connected in series pairs, each pair having a different current-carrying capacity, of a bridging conductor or cross connection permanently joining points of equi-potential in said pairs.

In testimony whereof, I have hereunto subscribed my name this 29th day of April, 1908.

WILLIAM COOPER.

Witnesses:
HOWARD L. BEACH,
BIRNEY HINES.